United States Patent
Perrow et al.

(10) Patent No.: US 6,533,667 B2
(45) Date of Patent: Mar. 18, 2003

(54) TRIPOT CONSTANT VELOCITY JOINT HAVING BALL MODULES

(75) Inventors: Scott Jay Perrow, Freeland, MI (US); Christopher Mark Charlebois, Saginaw, MI (US); Thomas E. Beyer, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/747,322

(22) Filed: Dec. 21, 2000

(65) Prior Publication Data

US 2002/0082095 A1 Jun. 27, 2002

(51) Int. Cl.[7] .............................................. F16D 3/205
(52) U.S. Cl. ..................... 464/111; 464/132; 384/577; 29/898.065
(58) Field of Search ................. 464/111, 120, 464/122, 123, 124, 125, 128, 129, 130, 132, 905; 384/572, 575, 576; 29/898.064, 898.065, 898.067

(56) References Cited

U.S. PATENT DOCUMENTS

| | | | |
|---|---|---|---|
| 3,554,494 A | | 1/1971 | Bee |
| 3,818,721 A | * | 6/1974 | Wahlmark .................. 464/111 |
| 4,181,764 A | | 1/1980 | Totten |
| 4,512,750 A | * | 4/1985 | Orain ......................... 464/111 |
| 4,540,160 A | | 9/1985 | Zanavich et al. |
| 4,684,107 A | | 8/1987 | Robbins, Jr. |
| 4,953,830 A | | 9/1990 | Weaver, III |
| 5,100,109 A | | 3/1992 | Robbins, III |
| 5,209,700 A | * | 5/1993 | Bensinger et al. ........... 464/111 |
| 5,458,942 A | | 10/1995 | Miller |
| 5,496,217 A | | 3/1996 | Perrow et al. |
| 5,501,533 A | * | 3/1996 | Williams et al. ............. 384/572 |
| 5,591,085 A | * | 1/1997 | Stall et al. ................... 464/111 |
| 6,003,229 A | * | 12/1999 | Beduhn et al. |

FOREIGN PATENT DOCUMENTS

| | | | | |
|---|---|---|---|---|
| DE | 868 378 | * | 2/1953 | .................. 384/572 |
| DE | 759 153 | * | 7/1953 | .................. 384/572 |
| FR | 2699620 | | 6/1994 | |

OTHER PUBLICATIONS

Universal Joint and Driveshaft Design Manual, Advances in Engineering Series No. 7, Warrendale PA, The Society of Automotive Engineers, Inc., p. 137, TJ1079.S62 1979.*

* cited by examiner

Primary Examiner—Greg Binda
(74) Attorney, Agent, or Firm—Edmund P. Anderson

(57) ABSTRACT

A tripot joint includes a tripot housing having a plurality of longitudinally extending ball channels for receiving a corresponding plurality of trunnions projecting from a shaft. Each trunnion is fitted with a ball module formed as a separate sub-assembly from the trunnions. Each ball module includes a roller ball having a bore in which a plurality of needle bearings is disposed. A bearing cage is received with a snap-fit connection within the bore to retain the needle bearing within the roller ball independently of the trunnions.

17 Claims, 5 Drawing Sheets

TRIPOT CONSTANT VELOCITY JOINT HAVING BALL MODULES

BACKGROUND OF THE INVENTION

1. Technical Field

This invention relates generally to constant velocity joints and more particularly to stroking tripot joints wherein a set of flat balls mounted on respective trunnions of a shaft assembly stroke and pivot within associated longitudinal ball channels of a tripot housing.

2. Related Art

Half shaft assemblies are typically used in automotive drive line applications, and particularly in front wheel drive applications to transmit torque from the transmission or transfer case to the drive wheels of the vehicle. The half shaft assembly typically comprises a rigid shaft fitted with constant velocity joints at its ends. A stroking tripot joint is typically used at the inboard end where the shaft assembly couples to the transmission or transfer case. The tripot joint is effective at permitting both pivoting angular movement and a certain amount of axial movement to accommodate adjustment in the effective length of the shaft assembly during operation.

A typical tripot joint includes a tripot housing having three longitudinally extending ball channels. The housing has a stub shaft or splined sleeve extending from a closed end which connects with the transmission of the vehicle. The opposite end of the housing is open to receive a spider carried on the half shaft. The spider includes three radially outwardly extending trunnions which align with the ball channels of the housing. Each trunnion mounts a flat roller ball which is journalled on the trunnion by a plurality of needle bearings. A washer-like ball retainer fits over the free end of the trunnions and is retained by a ring accommodated within a ring groove machined in the running surface of the trunnions adjacent the free end. The ball retainer is able to rotate on the trunnion and projects radially outwardly to confront the bearings and roller ball to prevent the roller balls and needle bearings from being slid off the free end of the trunnions.

The ball retainers and retaining rings thus operate to support the needle bearings and roller balls on the trunnions until such time as the spider assembly is installed within the housing of the joint.

One disadvantage of the present ball retention system is that it adds cost and complexity to the manufacture of tripot joints by requiring the trunnions to be machined to include the retaining grooves and requires the additional components of the ball retainer and retaining ring for each trunnion.

There is also cost in handing and assembling the numerous loose needle bearings about the trunnion shafts and supporting them while installing the roller balls, ball retainers and retaining rings to ensure that they remain in position until the assembly is complete.

An object of the present invention is to overcome or greatly minimize the foregoing limitations of the present ball retention system for tripot joints.

SUMMARY OF THE INVENTION

A constant velocity tripot joint according to the invention comprises a tripot housing having a plurality of longitudinally extending ball channels formed therein, a spider having a plurality of trunnions projecting radially outwardly to free ends arranged to be received within the ball channels of the housing. The assembly includes a plurality of ball modules formed as a separate, self-supporting structure from the trunnions and disposed thereon for receipt in the ball channels. Each ball module includes a flat roller ball having a bore, a plurality of needle bearings disposed within the bore, and a bearing cage coupled to the roller ball and supporting the needle bearings within the bore in rolling engagement with an inner surface of the bore.

Unlike the standard tripot joints described above, tripot joints constructed according to the invention include the described ball modules which are formed as a separate preassembled unit apart from the trunnions. In this manner the assembly and construction of the joint is simplified by enabling the ball modules to be installed on the trunnions at a point just prior to the assembly of the spider into the housing. By providing a ball cage which retains the roller bearings within the bore of the roller balls, there is no longer the need to machine a retaining groove in each of the trunnions or to provide the ball retainer and retaining ring components for each trunnion as previously described.

The invention recognizes the advantages of preassembling the bearings with the roller balls rather than on the trunnions which enables the ball modules to be separately manufactured and supplied as a pre-manufactured, self-contained component and which is no longer dependent for support on the ball retainer and retaining rings.

The invention further recognizes that the roller balls and bearings, once installed within the ball channels, are supported against removal from the trunnions by the walls of a housing, and thus there is no need for longitudinal retention between the tunnion and the needle bearings and/or roller balls. A further advantage of the invention is that the roller balls are free floating in the longitudinal direction of the trunnions and thus the movement of the joint is not restricted by interference between longitudinal displacement of the roller balls and confrontation with any ball retainers or retaining rings of prior joint assemblies.

The roller cage preferably includes two or more webs or struts extending along the inner surface of the roller ball which separate the roller bearings into groups and help guide and support the roller bearings during rotation of the roller balls to keep the roller bearings aligned in the longitudinal direction of the trunnions.

The invention further provides a method of making a tripot joint including providing a spider having a plurality of radially outwardly extending trunnions that fit within longitudinally extending ball channels of a tripot housing, and forming a plurality of ball modules each including a roller ball having a plurality of needle bearings disposed within a bore of the roller ball and a bearing cage mounted to the roller ball to retain the needle bearings within the bore. The method includes disposing one of the ball modules on each of the trunnions and then extending the trunnions and roller ball modules into respective ball channels of the housing. The method shares the same advantages described above over prior tripot joints and manufacturing methods.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
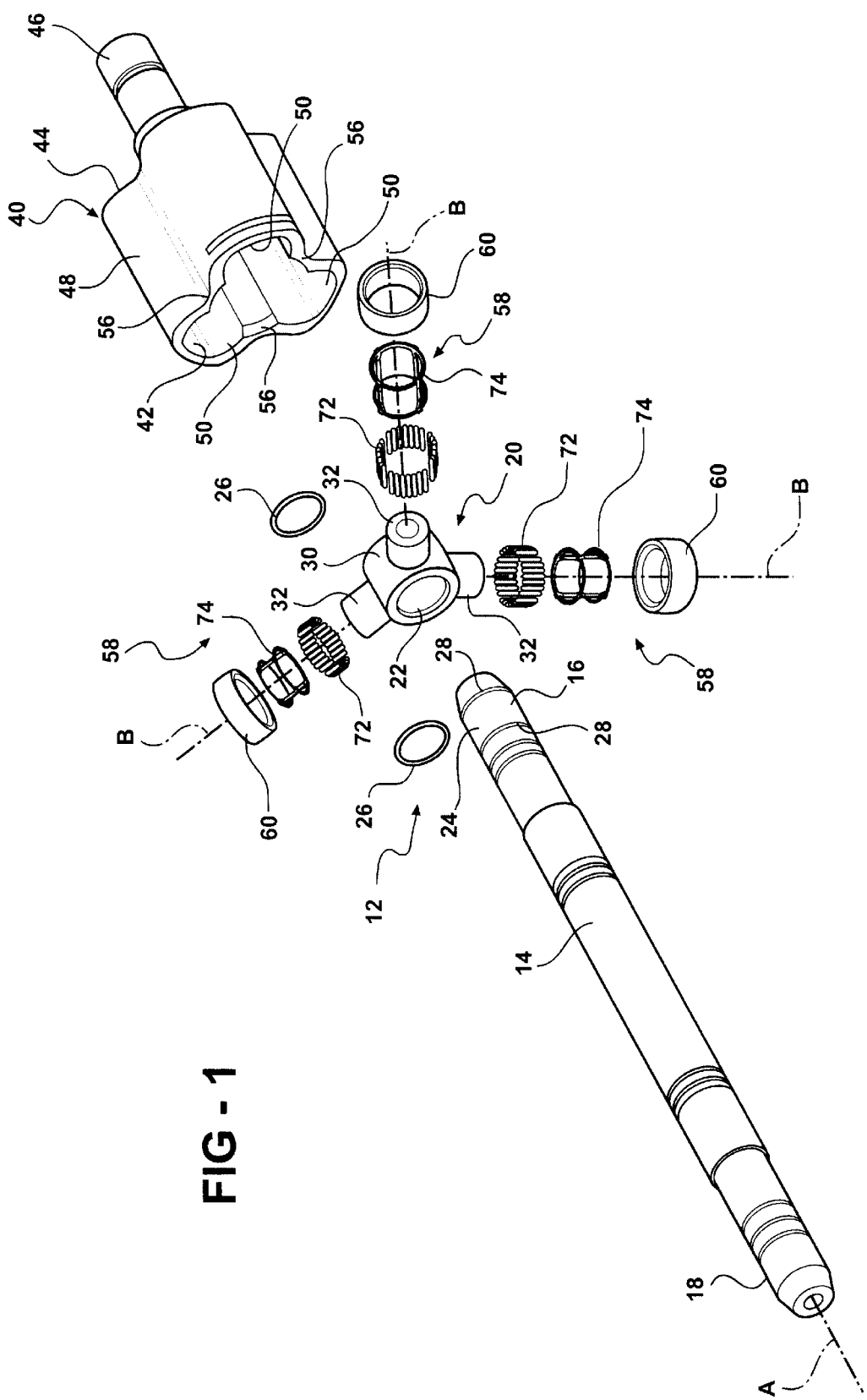
FIG. 1 is an exploded perspective view of a tripot joint constructed according to the invention.
Figure 2:
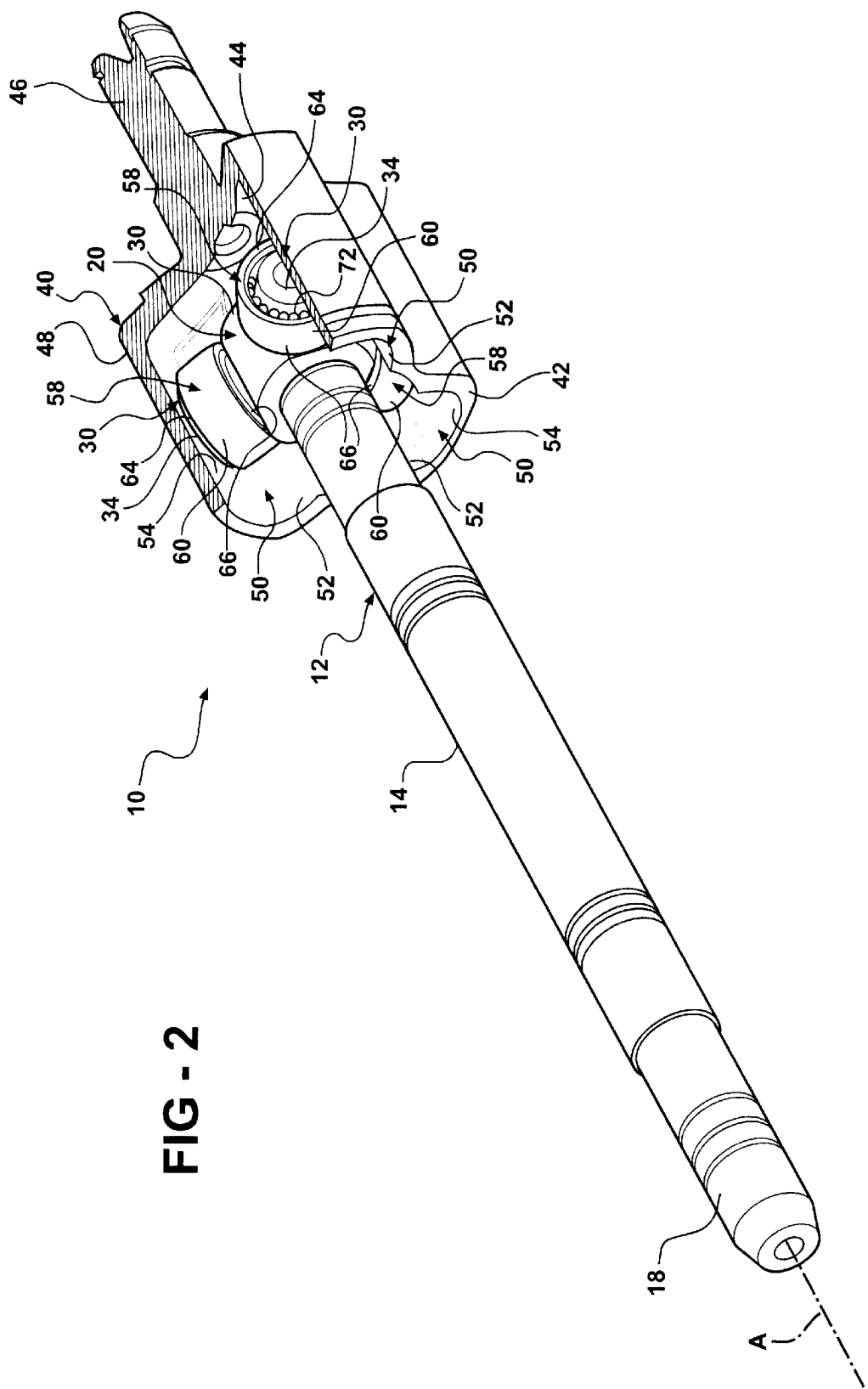
FIG. 2 is a fragmentary sectional view of an assembled joint of FIG. 1.

A constant velocity tripot stroking joint constructed according to the invention is shown generally at 10 in FIGS. 1 and 2 and comprises a half shaft assembly 12 having a rigid metal shaft 14 extending longitudinally along an axis A between opposite axial ends 16,18. A spider 20 is mounted on one of the ends 16. The spider 20 has an internally splined bore 22 which mates with an externally splined section 24 of the shaft 14 adjacent the end 16. The splined connection fixes the spider 20 against rotation relative to the shaft 14. Retaining rings 26 are disposed in corresponding ring grooves 28 of the shaft 14 on either side of a body 30 of the spider 20 to fix the spider 20 against relative longitudinal movement on the shaft 14.

Figure 4:
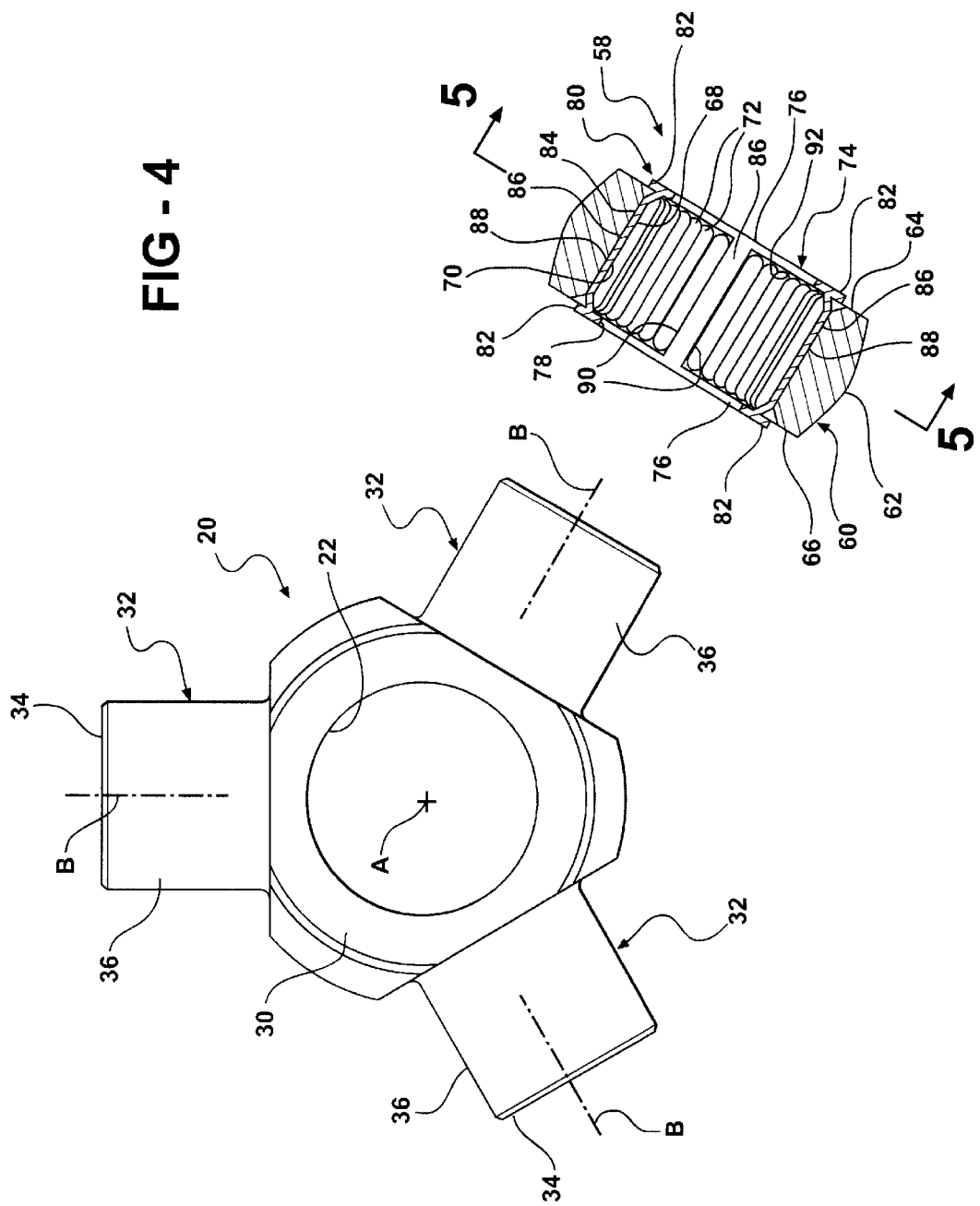
FIG. 4 is an enlarged exploded end view, shown partly in section, of components of the assembly.

A plurality of trunnions 32 project radially outwardly from the body 30 along trunnion axis B transverse and preferably perpendicular to the axis A of the assembly 10. Referring to FIG. 4, there are preferably three of such trunnions 32 spaced equal distantly from one another and extending from the body 30 to free ends 34. The trunnions 32 have a cylindrical stub shaft construction with an outer cylindrical bearing surface 36. The trunnions 32 are preferably free of any retaining ring grooves adjacent their free ends 34.

The tripot joint 10 has a tripot housing 40 that has an open end 42 and a closed end provided by end wall 44 from which a drive connection such as a stub shaft 46 extends for connection to a drive member (not shown).

The housing 40 has a side wall 48 extending from the end wall 44 to the open end 42 which is contoured to provide a plurality of longitudinally extending ball channels 50 (preferably three) which are oriented with respect to the spider 20 to receive the trunnions 32 therein through the open end 42. Each ball channel 50 has laterally disposed running surfaces 52 which are spaced from one another and joined by a radially outer wall portion 54 of the housing 40. The ball channels 50 are interconnected by radially inwardly extending land portions 56.

The joint 10 includes a plurality of ball modules 58 associated with each of the trunnions 32. Each ball module 58 includes a roller ball element 60 (sometimes referred to as a "flat ball") having an outer generally cylindrical running surface 62 extending between opposite end faces 64,66 having a rotation axis. As illustrated in the drawings, the outer running surface 62 is preferably somewhat barrel-shaped such that when viewed in cross section along the axis B of the roller ball 60 and its associated trunnion 32, as best shown in FIG. 4, the outer surface 62 has a slightly rounded convex profile between the end faces 64,66. The running surfaces 52 of the ball channels 50 are also preferably rounded and thus slightly convexly curved when the housing 40 is viewed along the longitudinal axis looking in through the open end 42. The curvature of the outer roller ball surface 62 and ball channel running surfaces 52 is known per se and may correspond to the surface profiles commonly used or which may be used in the tripot ball joint art. In other words, the invention is not to be limited by the particular outer surface configuration of the roller balls 60 or the ball channels 50.

Figure 5:
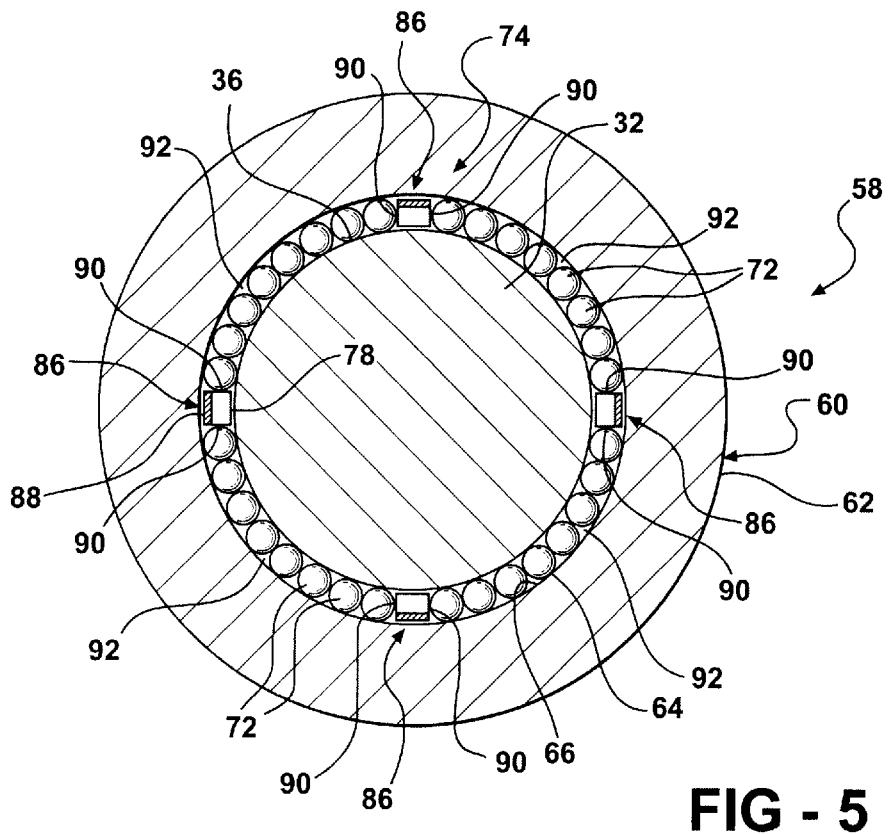
FIG. 5 is an enlarged cross-sectional view along lines 5—5 of FIG. 4 shown with the ball module shown installed on the trunnion.

Each roller ball 60 is formed with a bore 68 extending along the longitudinal axis B between the end faces 64,66. The bore 68 has an inner running surface 70 which is cylindrical and oversized in relation to the outer diameter of the trunnions 32. A plurality of needle bearings 72 are disposed in the bore 68 of each roller ball 60. The needle bearings 72 are retained in the bore 68 of the roller balls 60 by a bearing cage 74 in such manner that the roller ball 60, needle bearing 72 and bearing cage 74 can be assembled as a separate, self-contained unit or module apart from the trunnions 32, as best illustrated in FIGS. 4 and 5.

The bearing cage 74 mounts within the bore 68 and preferably includes a pair of spaced end walls 76 having an inner edge 78 spaced radially inwardly of the inner surface 70 of the bore 68 of the roller ball 60 in such manner as to confront the opposite ends of the needle bearings 72 to retain the needle bearings 72 against inadvertent removal from the roller balls 60 in the direction of the longitudinal axis B. The end walls 76 are thus disposed adjacent the end faces 64,66 of the roller ball 60 and project radially inwardly thereof to retain the needle bearings 72.

The end walls 76 carry retaining features 80 which are operative to engage the roller ball 60 to secure the bearing cage 74 within the bore 68. According to the first embodiment, the retaining features 80 comprise a plurality of locking tabs 82 projecting radially outwardly from an outer diameter surface 84 of the cage end walls 76. The tabs 82 provide the bearing cage 74 with a effective outer diameter slightly greater than the inner surface diameter 70 of the bore 68 of the roller ball 60. The end walls 76 are joined by a plurality of struts 86 which extend longitudinally between and interconnect to the end wall 76. The struts 86 have radially outer wall surfaces 88 which engage the inner surface 70 of the bore 68 when the cage 74 is installed in the roller ball 60. The struts 86 have side edges 90 which are spaced circumferentially from one another to provide open window regions 92 between adjacent struts 86. In the illustrated embodiment, there are four such struts 86, between which are four windows 92.

The bearing cage 74 may be fabricated of a resilient metal material such as spring steel or other metal material providing sufficient elastic resiliency to enable the cage 74 to be installed on the bore 68, or may be manufactured from other non-metallic materials such as glass-filled nylon or the like that would achieve the same purpose. The cage 74 is installed in the bore 68 preferably by a snap-lock connection through engagement of mutual retention features of the cage 74 and roller ball 60 by forcing the locking tabs 82 at one end of the cage 74 into one end of the bore 68 and advancing it through the bore to the point where the locking tabs 82 emerge from the other side, whereupon the tabs 82 return outwardly and engage the end faces 64,66 of the roller ball 60 on opposite sides of the bore 68.

Once the cage 74 is installed in the bore 68, the open windows 92 are packed with grease and corresponding sets of the needle bearing 72 are disposed therein and retained axially by the end walls 76 of the cage 74 and radially by the static friction of the packed grease. If desired, a cardboard keeper or the like may be inserted into the bore to further retain the needle bearing 72 until ready for use.

The separately formed ball modules 58 are slid onto the free ends 34 of the trunnions 32, and then extended into the ball channels as best illustrated in FIG. 2. It will be appreciated that the only structure supporting the roller ball 60 against removal from the trunnions 32 once installed in the housing 40 is the outer wall portions 54 of the ball channels 50. There is no retainer or other structure carried on the trunnions 32 which would interfere with the removal of the roller ball 60 from the free end 34 of the trunnions 32. It will be appreciated also that once the roller balls 60 are installed in the ball channels 50, there is no need for any further retention of the roller ball 60 than that provided by the outer wall portions 54 of the ball, channels 50.

One advantage of the present invention is that the ball modules 58 can be manufactured separately from the trunnions 32 and can be readily incorporated into the assembly of the joint 10 at the point just prior to installing the spider 20 within the housing 40. Just prior to installation, three of the ball modules 58 are slid on to the trunnions 32 and then guided into the ball channels 50. The installation of the ball modules 58 can be readily incorporated into an automated assembly line, simplifying the process and reducing the labor involved in manufacturing tripot joints.

The ball modules 58 ride in the channels 50 and support the spider 20 and shaft 14 for angular pivoting movement as well as axial displacement relative to the housing 40. During angulation, the modules 58 are permitted to slide axially along the trunnions 32 in the direction of trunnion axis B to account for the change in distance for maintaining rolling contact with the ball channels 50.

Figure 6:
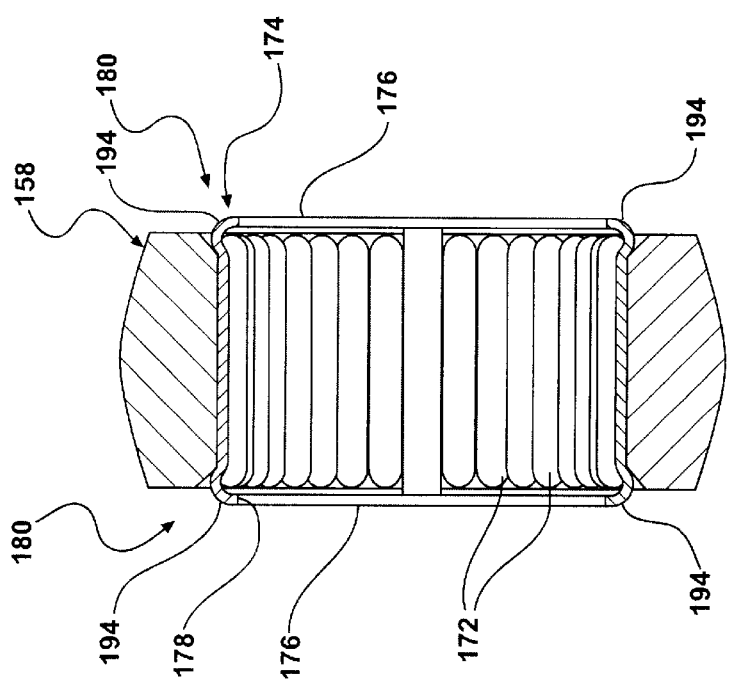
FIG. 6 is an enlarged cross-sectional view of an alternative ball module construction.
Figure 3:
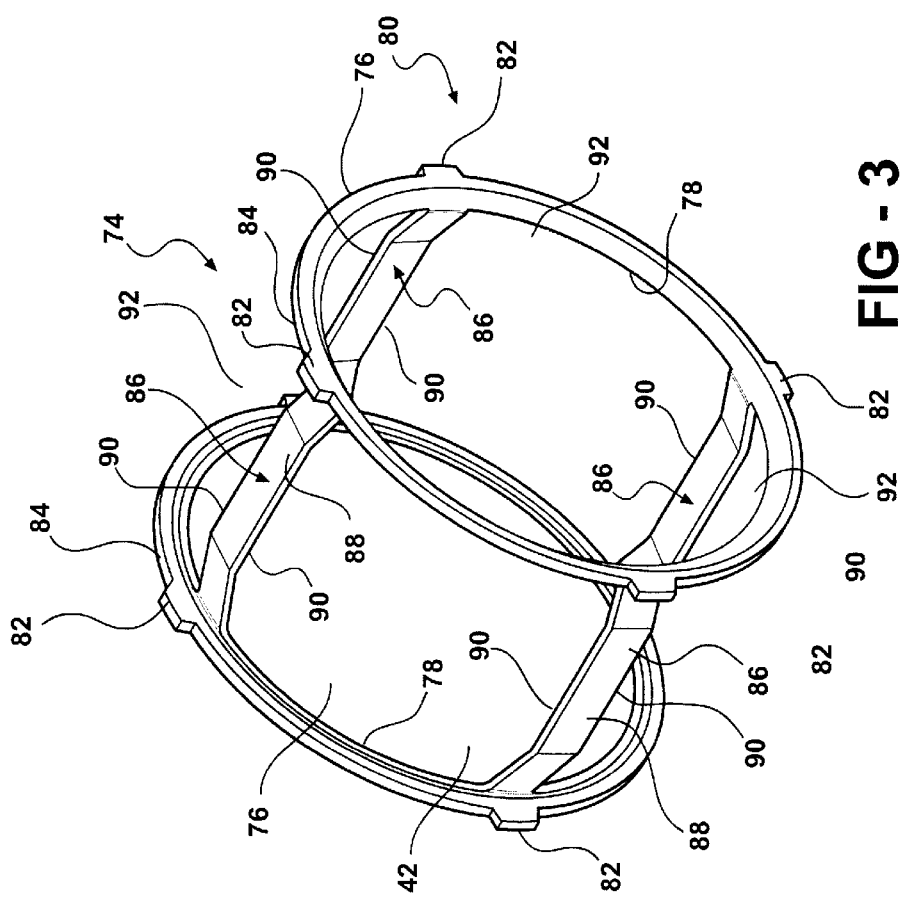
FIG. 3 is an enlarged perspective view of a bearing cage component of the assembly.
Figure 7:
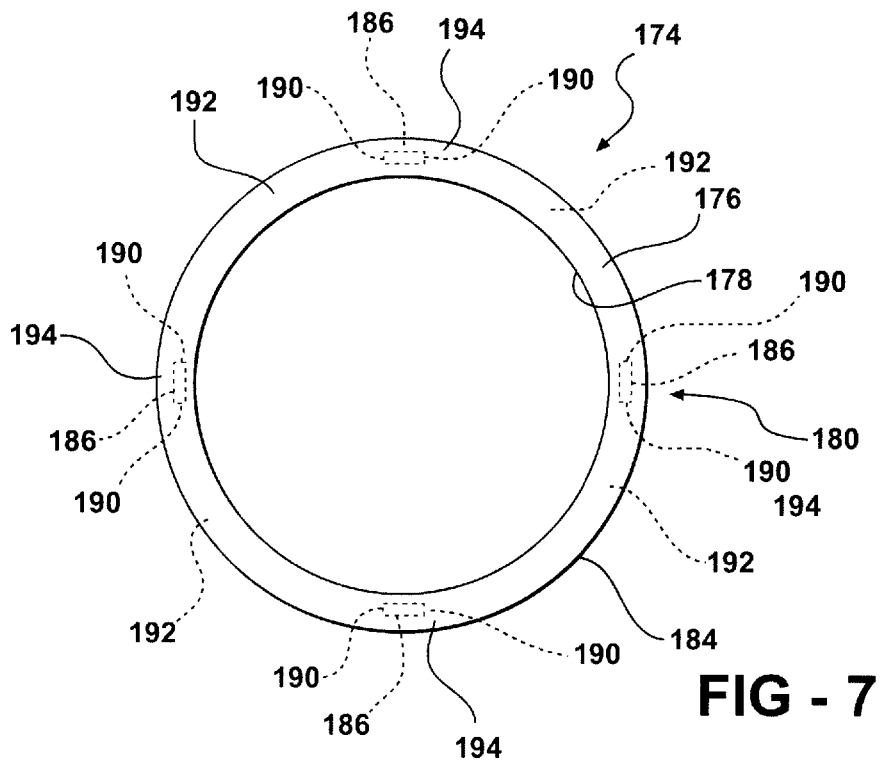
FIG. 7 is an enlarged end view of the bearing cage of FIG. 6.

FIGS. 6 and 7 show an alternative bearing module 158, wherein the same reference numerals are used to represent like features, but are offset by 100. The bearing cage 174 is the same as the bearing cage 74 of the first embodiment, except that the retaining features 180 are provided by radially outwardly undulating regions 194 of the end walls 176 adjacent struts 186, in lieu of the locking tabs 82. The outwardly projecting regions 194 operate in the same manner as the locking tabs 82 by deforming elastically inwardly to accommodate insertion of the bearing cage 174 through the bore 68 and returning elastically outwardly to engage the opposite end walls 64,66 of the roller ball 60 to retain the bearing cage 174 within the bore 68. The bearing cage 176 otherwise operates and is used in the same manner as the bearing cage 74 previously described and shares the same advantages.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A constant velocity tripot joint assembly comprising:
   a tripot housing having a plurality of longitudinally extending ball channels;
   a spider having a plurality of trunnions projecting radially outwardly to free ends thereof arranged for receipt in said ball channels, said trunnions having outer cylindrical bearing surfaces that are fixed against movement relative to said trunnions;
   a plurality of ball modules formed as a separate self-supporting structure from said trunnions for receipt in said ball channels, each of said ball modules including a flat roller ball having a bore with an inner diameter surface;
   a plurality of needle bearings disposed in said bore; and
   a bearing cage coupled to said roller ball and supporting said needle bearings within said bore of said roller ball in rolling engagement with said inner diameter surface of said bore and said outer cylindrical bearing surfaces of said trunnions.

2. The assembly of claim 1 wherein said cage is formed separately from said ball and thereafter assembled with said ball against removal from said ball.

3. The assembly of claim 1 wherein said cage and said ball have mutual retention features which engage to secure said cage within said ball.

4. The assembly of claim 1 wherein said cage has snap-lock features engageable with said ball to secure said cage with a snap-lock fit to said ball upon installation of said cage within said bore.

5. The assembly of claim 1 wherein said cage includes end walls projecting radially inwardly of said inner diameter surface of said bore.

6. The assembly of claim 5 wherein said needle bearings have opposite ends and said end walls project across at least a portion of said ends to retain said needle bearings against removal from said bore in an axial direction of said bore.

7. The assembly of claim 5 wherein said cage includes a plurality of struts extending across and joining said end walls of said cage.

8. The assembly of claim 7 wherein said struts are spaced from one another to define an open window between adjacent struts.

9. The assembly of claim 8 wherein said needle bearings are accommodated within said cage windows in rolling engagement with said inner diameter surface of said bore.

10. The assembly of claim 1 wherein said needle bearings are packed with grease.

11. The assembly of claim 1 wherein said cage supports said needle bearings within said ball independently of said trunnion associated with said ball module.

12. The assembly of claim 1 wherein said ball modules rely for radially outward retention on said trunnions solely on said housing.

13. A method of making a tripot joint, comprising:
    providing a shaft and a plurality of trunnions projecting radially outwardly of the shaft with each trunnion having an outer cylindrical bearing surface that is fixed against movement relative to the trunnion;
    providing a tripot housing having a plurality of ball channels extending in a longitudinal direction of the housing;
    forming a plurality of ball modules separately from the trunnions including forming a plurality of roller balls each having a bore, installing a plurality of needle bearings within the bore of each roller ball, and mounting a bearing cage on each roller ball in such manner as to support the needle bearings within the bores of the roller balls;
    disposing one of the ball modules on each of the trunnions to position the needle bearings in engagement with the cylindrical outer bearing surfaces of the trunnions; and
    extending the trunnions and ball modules within the housing to dispose the roller ball of each module within an associated ball channel of the housing.

14. The method of claim 13 including forming the bearing cage and roller ball with mutually engaging snap-lock retaining features and wherein the bearing cage is mounted with a snap-lock connection to the roller ball.

15. The method of claim 13 wherein the bearing cage is mounted to the roller ball by extending the bearing cage through the bore.

16. The method of claim 13 including forming radially outwardly projecting locking features on opposite ends of the bearing cage and engaging the locking features of the cage with ends of the roller ball to retain the cage against removal from the bore of the roller ball.

17. The method of claim 13 including forming the cage with a pair of end walls and a plurality of circumferentially spaced struts extending between and interconnecting the end walls and providing windows between adjacent struts, and disposing a plurality of the needle bearings in each of the windows.

* * * * *